(12) United States Patent
Lu

(10) Patent No.: US 11,849,204 B2
(45) Date of Patent: Dec. 19, 2023

(54) VEHICULAR CAMERA ASSEMBLY PROCESS USING LASER BRAZING DURING ACTIVE FOCUS AND ALIGNMENT TO SECURE LENS RELATIVE TO IMAGER

(71) Applicant: Magna Electronics Inc., Auburn Hills, MI (US)

(72) Inventor: Yuesheng Lu, Farmington Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 9 days.

(21) Appl. No.: 17/452,417

(22) Filed: Oct. 27, 2021

(65) Prior Publication Data

US 2022/0132007 A1 Apr. 28, 2022

Related U.S. Application Data

(60) Provisional application No. 63/106,383, filed on Oct. 28, 2020.

(51) Int. Cl.
| | |
|---|---|
| *H04N 23/55* | (2023.01) |
| *G02B 7/02* | (2021.01) |
| *G02B 27/62* | (2006.01) |
| *G03B 30/00* | (2021.01) |
| *H04N 23/51* | (2023.01) |
| *H04N 23/54* | (2023.01) |

(Continued)

(52) U.S. Cl.
CPC ............... *H04N 23/55* (2023.01); *G02B 7/02* (2013.01); *G02B 27/62* (2013.01); *G03B 30/00* (2021.01); *H04N 23/51* (2023.01); *H04N 23/54* (2023.01); *B60W 30/0956* (2013.01); *B60W 40/02* (2013.01); *B60W 2420/42* (2013.01); *B60W 2552/00* (2020.02); *B60W 2554/4029* (2020.02)

(58) Field of Classification Search
CPC ........ H04N 23/55; H04N 23/51; H04N 23/54; G02B 7/02; G02B 27/62; G02B 7/025; G03B 30/00; G03B 17/08; B60W 30/0956; B60W 40/02; B60W 2420/42; B60W 2552/00; B60W 2554/4029
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |

(Continued)

*Primary Examiner* — Nasim N Nirjhar
(74) *Attorney, Agent, or Firm* — HONIGMAN LLP

(57) ABSTRACT

A vehicular camera includes a lens barrel having a lens, a front camera housing having an aperture therethrough, and an imager printed circuit board (imager PCB) having an imager. The imager PCB is attached at the front camera housing with the imager aligned with the aperture. An attaching portion of the lens barrel is positioned at least partially in the aperture of the front camera housing with a gap between the attaching portion and the front camera housing that circumscribes the attaching portion. With the attaching portion positioned at least partially in the aperture, a filler material is disposed at least partially within the gap. After the lens is aligned relative to the imager, the filler material is heated to melt and flow into the gap, whereby the melted filler material hardens upon cooling to secure the lens barrel relative to the front camera housing and the imager PCB.

27 Claims, 4 Drawing Sheets

(51) Int. Cl.
*B60W 30/095* (2012.01)
*B60W 40/02* (2006.01)

(56) References Cited

U.S. PATENT DOCUMENTS

| | | | |
|---|---|---|---|
| 5,949,331 A | 9/1999 | Schofield et al. | |
| 7,965,336 B2 | 6/2011 | Bingle et al. | |
| 8,542,451 B2 | 9/2013 | Lu et al. | |
| 9,233,641 B2 | 1/2016 | Sesti et al. | |
| 9,277,104 B2 | 3/2016 | Sesti et al. | |
| 9,451,138 B2 | 9/2016 | Winden et al. | |
| 9,497,368 B1 * | 11/2016 | Winden | H04N 23/54 |
| 9,596,387 B2 | 3/2017 | Achenbach et al. | |
| 9,871,971 B2 | 1/2018 | Wang et al. | |
| 9,896,039 B2 | 2/2018 | Achenbach et al. | |
| 10,264,219 B2 | 4/2019 | Mleczko et al. | |
| 10,272,857 B2 | 4/2019 | Conger et al. | |
| 10,652,437 B2 | 5/2020 | Becker et al. | |
| 2004/0016873 A1 * | 1/2004 | Kida | H01L 33/62 250/214 R |
| 2007/0188699 A1 * | 8/2007 | Cech | A61B 3/125 351/159.02 |
| 2013/0242099 A1 | 9/2013 | Sauer et al. | |
| 2014/0373345 A1 | 12/2014 | Steigerwald | |
| 2015/0222795 A1 | 8/2015 | Sauer et al. | |
| 2015/0266430 A1 | 9/2015 | Mleczko et al. | |
| 2015/0365569 A1 | 12/2015 | Mai et al. | |
| 2016/0037028 A1 | 2/2016 | Biemer | |
| 2016/0264056 A1 * | 9/2016 | Uken | B60R 19/28 |
| 2016/0268716 A1 | 9/2016 | Conger et al. | |
| 2017/0133811 A1 | 5/2017 | Conger et al. | |
| 2017/0295306 A1 | 10/2017 | Mleczko | |
| 2017/0302829 A1 | 10/2017 | Mleczko et al. | |
| 2018/0059354 A1 * | 3/2018 | Gutierrez | G02B 7/022 |
| 2018/0072239 A1 | 3/2018 | Wienecke et al. | |
| 2020/0010024 A1 | 1/2020 | Sesti et al. | |
| 2021/0122299 A1 * | 4/2021 | Garcia | G03B 17/02 |
| 2021/0382375 A1 | 12/2021 | Sesti et al. | |
| 2022/0103723 A1 | 3/2022 | Skrocki et al. | |
| 2022/0373762 A1 | 11/2022 | Skrocki | |

\* cited by examiner

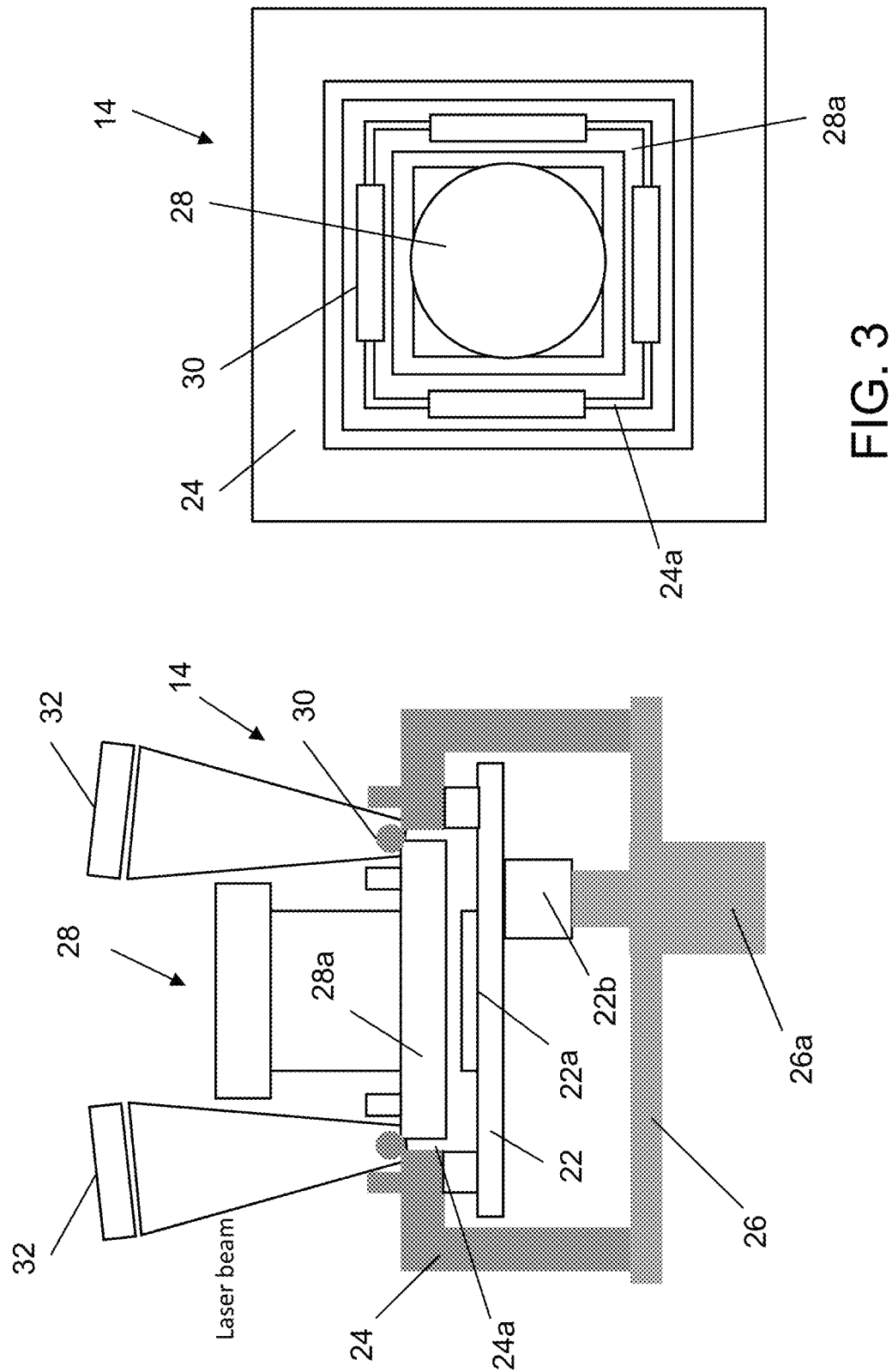

VEHICULAR CAMERA ASSEMBLY PROCESS USING LASER BRAZING DURING ACTIVE FOCUS AND ALIGNMENT TO SECURE LENS RELATIVE TO IMAGER

CROSS REFERENCE TO RELATED APPLICATION

The present application claims the filing benefits of U.S. provisional application Ser. No. 63/106,383, filed Oct. 28, 2020, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 10,652,437; 7,965,336; 5,949,331; 5,670,935 and/or 5,550,677, which are hereby incorporated herein by reference in their entireties.

SUMMARY OF THE INVENTION

A vehicular camera for a driver assistance system or vision system or imaging system for a vehicle utilizes one or more cameras to capture image data representative of images interior or exterior of the vehicle. The camera includes a lens holder or a front camera housing and an imager printed circuit board (imager PCB), with the imager PCB affixed to the lens holder, and with a lens barrel (accommodating an optic element or a lens or lens assembly therein) attached at the lens holder. The imager PCB (with the imager disposed thereat) is positioned at the lens holder and attached thereto, such as via fasteners or adhesive or the like. The lens barrel is disposed at an aperture through the lens holder and brazing/filling material is disposed along portions of a gap between the lens holder and lens barrel at the aperture. The lens is optically aligned and focused relative to the imager (by axially adjusting and/or radially adjusting and/or tilting the lens barrel relative to the lens holder to adjust the focus and optical alignment of the lens relative to the imager) and, with the lens in optical alignment and focus with respect to the imager, the brazing/filler material is heated, such as via a laser to melt or liquefy the material, whereby the material flows at least partially into and along the gap and, when cooled and re-solidified or hardened, retains or holds or secures the lens barrel relative to the lens holder and imager. A sealing material, such as an epoxy or the like, may be dispensed along and over the brazing material and along the gap to seal the gap between the lens barrel and the lens holder.

These and other objects, advantages, purposes and features of the present invention will become apparent upon review of the following specification in conjunction with the drawings.

BRIEF DESCRIPTION OF THE DRAWINGS

FIG. 2 is a sectional view of the camera, showing the imager circuit board attached at the lens holder or front camera housing, with the lens barrel disposed at an aperture of the front camera housing and with brazing/filler material disposed at a gap between the lens barrel and front camera housing;

FIG. 3 is a top plan view of the camera of FIG. 2;

DESCRIPTION OF THE PREFERRED EMBODIMENTS

A vehicle vision system and/or driver assist system and/or object detection system and/or alert system operates to capture images exterior of the vehicle and may process the captured image data to detect objects at or near the vehicle and in or at or near the predicted path of the vehicle. For example, a forward viewing camera disposed at and behind the windshield of the vehicle may capture image data of the scene forward of the vehicle for one or more driving assist systems of the vehicle. Optionally, one or more other cameras may be disposed at the vehicle with exterior fields of view, whereby the image data captured by those cameras may be processed for object detection and/or used to generate video images for viewing by the driver of the vehicle, such as to assist a driver of the vehicle in maneuvering the vehicle in a rearward direction. The vision system includes an image processor or image processing system that is operable to receive image data from one or more cameras and provide an output to a vehicle system and/or to a display device for displaying images representative of the captured image data. Optionally, the vision system may provide display, such as a rearview display or a top down or bird's eye or surround view display or the like.

Figure 1:
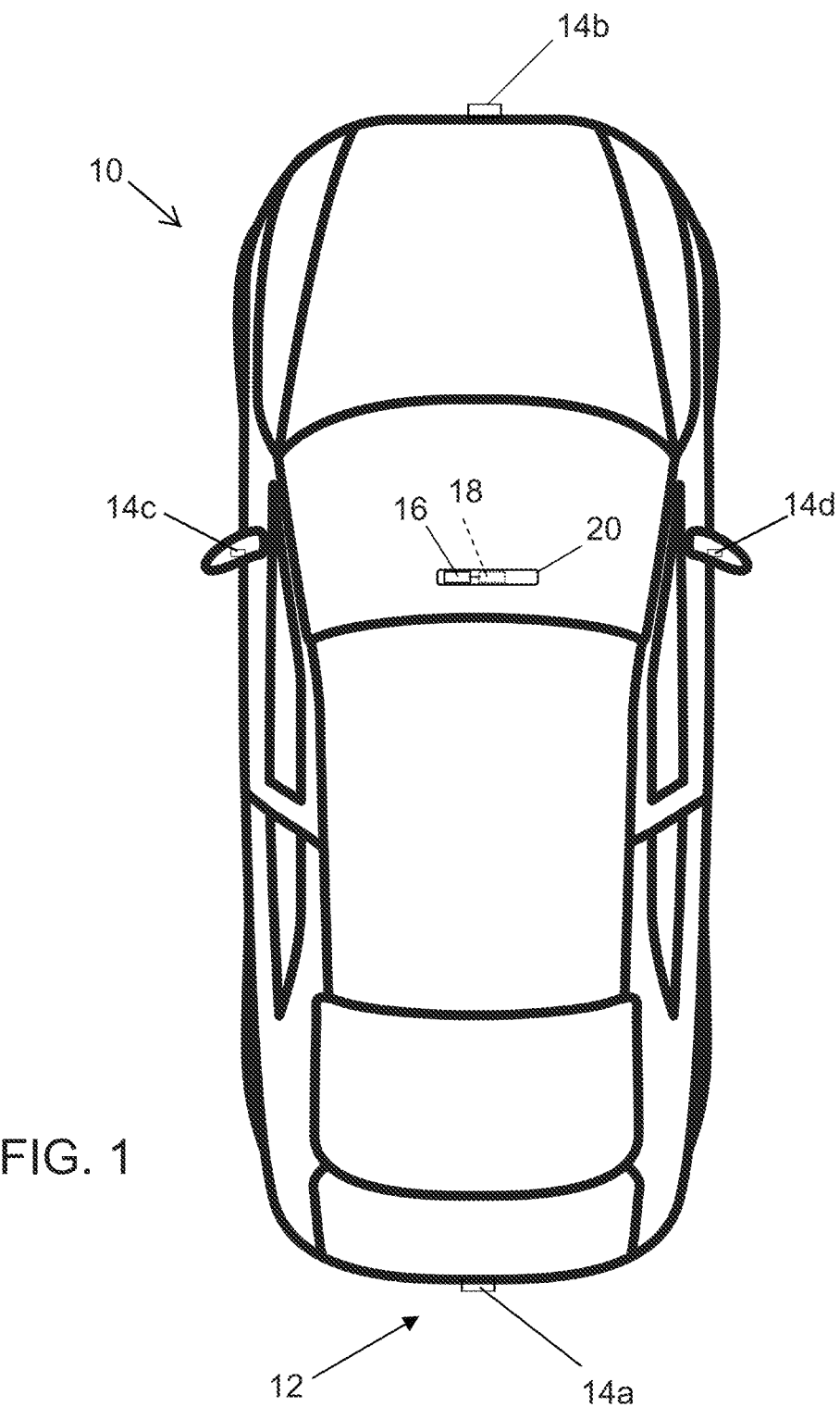
FIG. 1 is a perspective view of a vehicle with a vision system including at least one camera.
Figure 4:
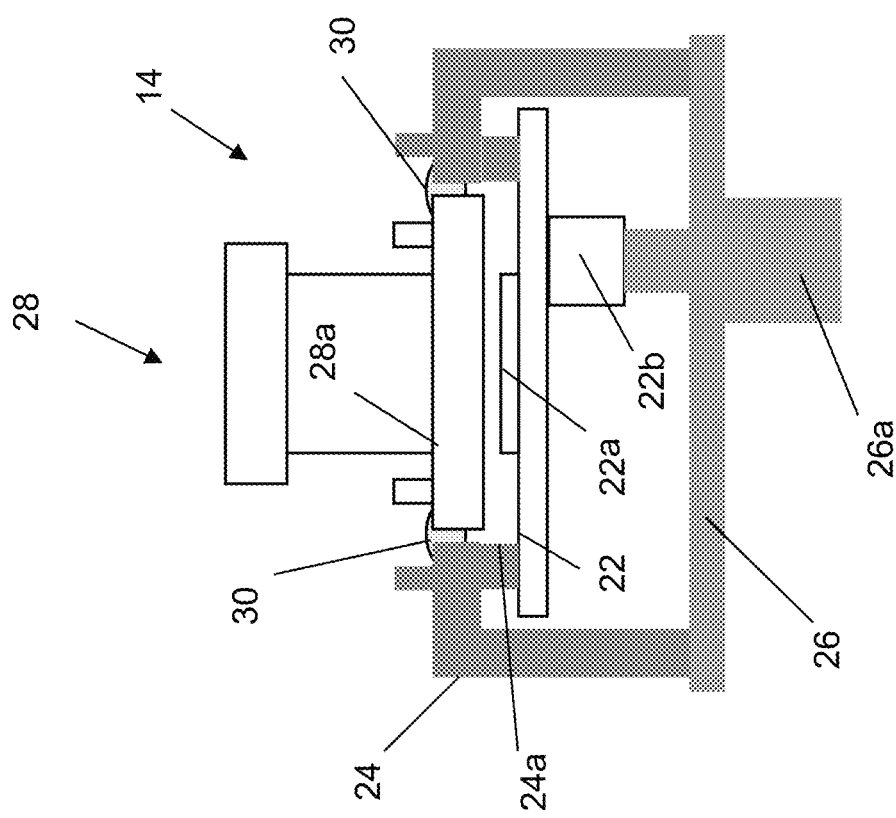
FIG. 4 is another sectional view of the camera, showing the melted brazing material that holds or secures the lens barrel relative to the front camera housing and relative to the imager.
Figure 6:
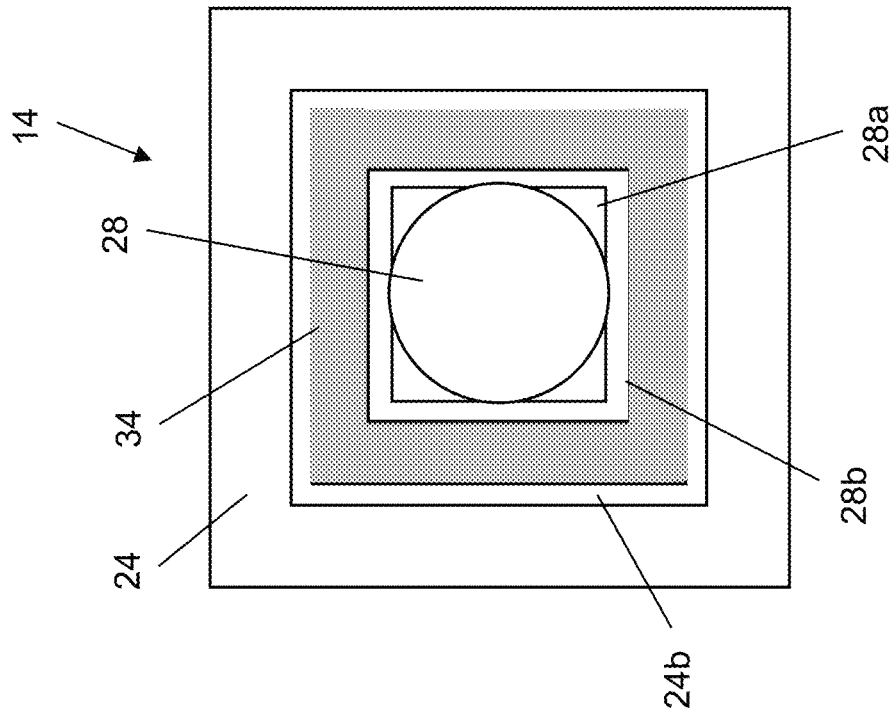
FIG. 6 is a top plan view of the camera of FIG. 5.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may, via processing by the image processor of image data, detect or determine presence of objects or the like and/or to generate images derived from captured image data and provide generated images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Typically, active focus and alignment is used to set and secure a focal position of a lens to an imager component. However, this leads to expensive and complicated measures to manage the compliance tolerances created by camera components and the manufacturing focus/alignment process. For example, a camera may be assembled using an active PCB alignment, which may use screws to secure a printed circuit board (PCB) having an imager disposed thereat to a lens holder or front camera housing of the camera assembly. After the PCB is secured to the lens holder, a lens barrel (such as a threaded lens barrel) that accommodates a lens is threaded into the lens holder and used to set the focus of the lens relative to the imager. After the lens and imager are optically aligned and focused (via threading the lens barrel into the lens holder), the lens barrel (and lens) is secured to the lens holder with adhesive on the lens threads.

Optionally, active lens alignment may be provided where the imager PCB is secured to the housing using screws and the lens is actively moved to set focus and alignment, whereby a quick cure adhesive is used to set the focus and alignment of the lens relative to the imager. The adhesive acts as a compliant material (before it is cured) to allow for focus and alignment, which is achieved by moving the lens relative to the lens holder. The UV and additional curing increases the tolerance stack of the finished assembly. Quick cure adhesives require UV curing and additional curing. This curing increases the tolerance stack of the finished assembly.

Optionally, active PCB focus and alignment may be achieved via a one piece lens assembly that is secured to the housing or lens holder utilizing adhesive initially, and then the imager PCB is actively moved relative to the housing or lens holder to set focus, alignment, and rotation, where a quick cure adhesive is used to set the focus, alignment, and rotation. The adhesive (that bonds the circuit board to the lens holder) acts as a compliant material (before it is cured) to allow for focus and alignment, which is achieved by moving the PCB relative to the lens holder. The UV and additional curing increases the tolerance stack of the finished assembly, and quick cure adhesives require UV+additional curing. This curing increases the tolerance stack of the finished assembly.

Referring now to FIGS. 2-6, an alternative build assembly process utilizes laser brazing of a filler material (that has a lower melting point than that of the material of the lens barrel attaching portion and of the material of the camera housing) to secure the lens barrel relative to the lens holder or front camera housing and relative to the imager printed circuit board (imager PCB) and imager after the optical alignment and focusing process that aligns and focuses the lens relative to the imager. The focus and optical alignment process allows for all degrees of freedom to be compensated for with adjusting the lens holder and lens barrel relative to the PCB for alignment and focus of the lens relative to the imager.

As shown in FIG. 2, the imager assembly or camera 14 comprises an imager printed circuit board (PCB) 22 having an imager 22a disposed thereat. In the illustrated embodiment, the imager PCB 22 is housed or supported at a lens holder or front camera housing 24, such as via fasteners or adhesive or the like. The imager PCB 22 may include an electrical connector 22b at its rear side (opposite the side at which the imager 22a is disposed) for electrically connecting to a connector portion 26a of a rear housing or cover portion 26. Optionally, the camera 14 may have two (or more) printed circuit boards, with the imager being disposed at the imager printed circuit board and with the electrical connector disposed at a connector printed circuit board, and with circuitry of the printed circuit boards being electrically connected via a flexible ribbon cable or the like.

The front camera housing 24 has an aperture 24a formed therethrough for at least partially receiving a lens barrel 28 that accommodates an optic element or a lens or lens assembly (comprising a plurality of lens optics or elements). As can be seen with reference to FIGS. 2 and 3, the aperture 24a is shaped to generally correspond with the shape of a base portion or attaching portion 28a of the lens barrel 28. In the illustrated embodiment, the aperture 24a and the attaching portion 28a are rectangular or square-shaped (but the aperture and the lens barrel attaching portion may comprise other shapes, such as circular shapes), with the aperture 24a having cross dimensions that are slightly larger than the cross-dimensions of the attaching portion 28a, so that the lens barrel 28, with the attaching portion 28a received at the aperture 24a, can be laterally adjusted (in the x-y directions) and axially adjusted (in the z direction) and can be tilted relative to the front housing portion and the imager to optically align and focus the lens relative to the imager 22a.

As shown in FIG. 2, with the attaching portion 28a of the lens barrel 28 received at the aperture 24a, a brazing or filler material 30 is disposed partially along the gap between the sides of the attaching portion 28a and portions of the front housing portion 24 that circumscribe or define the aperture 24a. As shown in FIG. 3, the brazing material may be dispensed partially along each side at the gap so as to cover a portion of the surface of the front housing 24 circumscribing the aperture 24a and a portion of the surface of the attaching portion 28a at the aperture 24a and span the gap between the front housing and the attaching portion (see FIG. 4). With the lens barrel 28 adjusted so that the lens is optically aligned and focused relative to the imager 22a, the brazing material 30 is heated, such as via a heating device, to melt and flow into the gap. For example, the heating device may include one or more lasers 32 (e.g., the illustrated system may utilize four lasers, each laser being directed at a respective filler material segment) operated or powered to heat the brazing material 30 and to cause the brazing material 30 to melt and flow into the gap at least partially along the respective sides or edges of the attaching portion 28a of the lens barrel. The lens barrel 28 and front housing portion 24 and imager 22a are held or fixtured until the melted brazing material cools and hardens, at which time the lens is secured relative to the imager.

Figure 5:
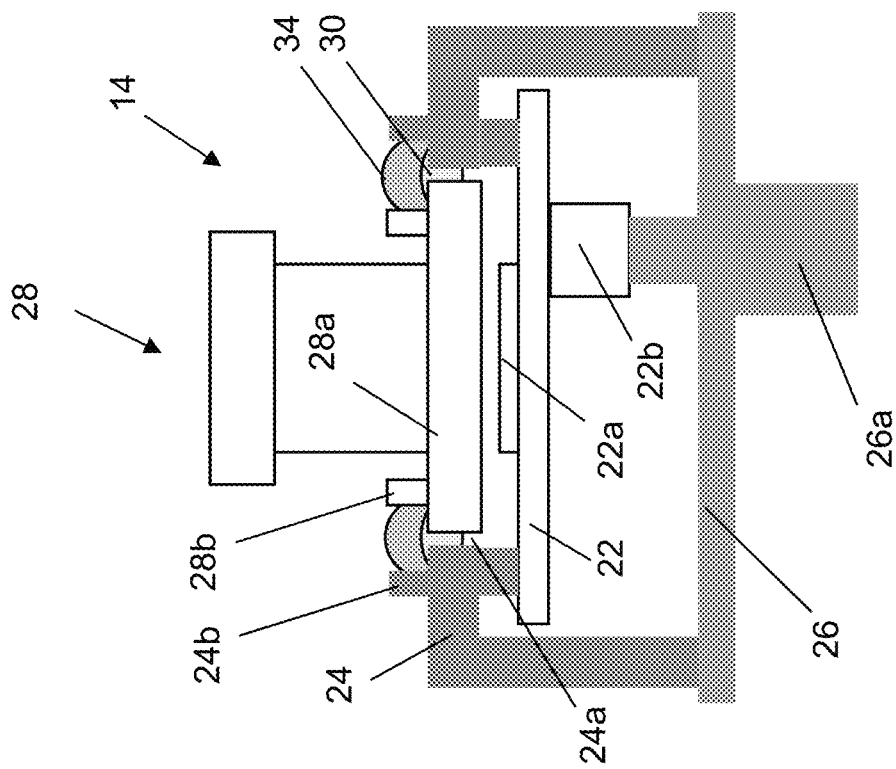
FIG. 5 is another sectional view of the camera, showing a sealant applied over the cooled and re-solidified brazing material and along and over the gap.

After the brazing material is hardened, a sealant 34 (FIGS. 5 and 6), such as an epoxy or other suitable sealing material, is dispensed or applied along the gap between the attaching portion 28a and the portion of the front housing 24 circumscribing the aperture 24a to seal the gap between the attaching portion 28a of the lens barrel and the front housing portion. As shown in FIG. 5, the front camera housing 24 may have a raised rib or protrusion 24b that circumscribes the aperture 24a, and the lens barrel attaching portion 28a may also have a raised rib or protrusion 28b that is disposed at the outer surface of the attaching portion near the perimeter edge of the attaching portion. When the lens barrel is at the camera housing and the attaching portion 28a is disposed in the aperture 24a, the raised protrusions 24b and 28b provide a channel along the gap in which the sealant can be dispensed to seal the gap.

The cross dimensions of the attaching portion 28a and the aperture 24a are selected or configured to allow for movement of the attaching portion within the aperture and across the aperture and to allow for twisting or tilting of the attaching portion within the aperture, so as to allow for adjustment in multiple degrees of freedom during the focus and alignment of the lens relative to the imager. When the attaching portion 28a is received in the aperture 24a, the lens barrel 28 is adjusted relative to the imager 22a to optically align and focus the lens relative to the imager (with the attaching portion moving within the aperture of the front camera housing).

When the lens has been properly focused and aligned relative to the imager, a heating device (such as a laser) heats and melts or liquefies the brazing or filler material to secure the lens relative to the imager. The heating device may comprise a laser or a hot air heating device or an induction heating device or flame or the like. The heating device may apply the heat directly to the brazing or filler material or the heating device may heat the environment around the camera to melt the brazing device. For example, the heating device may be an oven or similar device and the camera, with the lens and imager aligned and focused, may be placed within a compartment of the heating device and heated to a suitable temperature to melt the brazing material without overheating the camera assembly. Thus, the lens is optically aligned and focused relative to the imager, and the filler material is heated to cause the material (e.g., a thermoplastic material or a soft metal with a lower melting point than the material of the lens barrel attaching portion and the front camera housing) to melt and to flow into the gap or joint between the lens barrel attaching portion and the camera housing, and then is cooled to re-solidify, whereby the lens barrel is secured to the front camera housing and relative to the imager PCB, with the lens optically aligned and focused relative to the imager.

Thus, the imager PCB is attached to the front or upper housing by, such as by screws or heat staking (such as by utilizing aspects of the camera assemblies described in U.S. patent application Ser. No. 17/448,534, filed Sep. 23, 2021, now U.S. Pat. No. 11,700,439, which is hereby incorporated herein by reference in its entirety). Optionally, the imager PCB may be disposed at the rear housing, such as at a rear surface of the rear housing, so that when the rear housing and front housing are mated or otherwise joined together, the imager at the imager PCB may face and be aligned with the aperture of the front housing. The upper or front housing and the lower or rear housing are laser welded together prior to the focus and alignment of the lens relative to the imager. The lens is fixtured or gripped and is 5-axis focused and aligned with the imager. While the lens is held in its focused and aligned position, another robot arm dispenses or places brazing/filler material in multiple places along the gap between the lens barrel and the front housing. The laser beam is powered and heats and melts the brazing/filler material, and fixes the lens barrel and lens to the upper housing. A sealing epoxy is applied to seal the lens barrel relative to the front housing, such as for exterior cameras that need to be sealed.

The laser brazing concept is applicable to both metal and plastic housings. The filler material (with a selected or appropriate melting temperature that is lower than the material(s) of the lens barrel attaching portion and the front camera housing) and the welding laser are selected based on the material of the housings. The filler material has a melting point that is lower than the lower melting point of the lens barrel attaching portion and of the housing, such that neither the attaching portion nor the housing melt during the laser heating of the filler material. For example, for applications with a plastic housing and lens barrel, a plastic filler material (having a melting point lower than the plastic material of the housing and lens barrel) may be used, and for applications with a metal housing and/or lens barrel, a metal or plastic filler material (having a melting point lower than the metal material of the housing and/or lens barrel) may be used. Also, the amount or size/quantity of brazing material is selected to provide the desired attaching strength. The brazing material can be applied by a small robot arm with a suction tip or the like.

Thus, the camera and assembly process actively focuses and aligns the imager plane to the lens image plane, but instead of quick cure adhesive or other components, the image plane is set and secured by non-contact brazing. The heat may be applied at the filler material via lasers, hot air, induction, flame, or other suitable process. The filler material may comprise any suitable material that melts or deforms (so as to flow into the gap), and then re-solidifies when cooled, such as a thermoplastic or soft metal.

The non-contact heating occurs while the robot is holding the lens barrel and imager in optical alignment and focus. During heating, the filler material melts or deforms to fill in the gaps and to contact the attaching portion and the front camera housing, and then re-solidifies. The assembly process eliminates use of an expensive quick cure adhesive, and eliminates expensive UV and secondary curing. The system and process may also decrease assembly tolerances by instantly setting the image plane and the lens plane with non-contact brazing. The system and process may also provide enhanced or increased thermal transfer, decreased cycle time and a reduction in required capital.

The camera may utilize aspects of the cameras described in U.S. patent application Ser. No. 17/303,784, filed Jun. 8, 2021, now U.S. Pat. No. 11,635,672, and/or U.S. provisional applications, Ser. No. 63/261,531, filed Sep. 23, 2021, and/or Ser. No. 63/203,898, filed Aug. 4, 2021, which are all hereby incorporated herein by reference in their entireties. Optionally, the lens barrel and front housing portion may be part of an imager assembly that is part of a camera, where the imager assembly may be disposed at a housing portion and the flexible connector may be electrically connected to another circuit board of the camera (such as a processor circuit board having an image processor and other circuitry disposed thereat), such as by utilizing aspects of the windshield-mounted camera assemblies described in U.S. Pat. Nos. 9,896,039; 9,871,971 and/or 9,596,387, which are all hereby incorporated herein by reference in their entireties. Optionally, the camera may comprise an exterior-mounted camera, where a rear housing may be mated with the lens holder after the imager printed circuit board is attached to the lens holder, such as by utilizing aspects of the windshield-mounted camera assemblies described in U.S. Pat. Nos. 10,272,857 and/or 10,264,219, which are hereby incorporated herein by reference in their entireties. The camera assembly includes an electrical connector portion that is configured to electrically connect to a vehicle wire harness when the camera is installed at a vehicle.

Although shown as having a single printed circuit board (having the imager at one side and circuitry and connecting elements (such as a header connector) at the other side), the camera assembly may include an imager printed circuit board and a separate connector printed circuit board, with the circuitry of the two printed circuit boards electrically connected. The printed circuit boards may be attached at the lens holder or to the rear camera housing, and/or may be attached to one another, such as by utilizing aspects of the cameras and processes described in U.S. Publication No. US-2020-0010024, which is hereby incorporated herein by reference in its entirety. The imager is aligned with the lens at the lens holder and the lens is optically aligned and focused with the imager and the housing portions are joined or bonded, such as by utilizing aspects of the cameras and processes described in U.S. Pat. Nos. 10,272,857; 10,264,219; 9,451,138; 9,277,104 and/or 8,542,451, which are hereby incorporated herein by reference in their entireties.

The camera may include electrical connecting elements that accommodate tolerances in the housing and/or PCB mounting and/or connector portion. The electrical connecting elements may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569; US-2016-0037028; US-2016-0268716; US-2017-0133811; US-2017-0295306 and/or US-2017-0302829, which are hereby incorporated herein by reference in their entireties. Optionally, the electrical connections may be established via molded interconnect device (MID) technology, such as by utilizing aspects of the cameras described in U.S. Publication Nos. US-2018-0072239; US-2017-0295306 and/or US-2016-0037028, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties.

Optionally, the camera may comprise a forward viewing camera, such as disposed at a windshield electronics module (WEM) or the like. The forward viewing camera may utilize aspects of the systems described in U.S. Pat. Nos. 9,896,039; 9,871,971; 9,596,387; 9,487,159; 8,256,821; 7,480,149; 6,824,281 and/or 6,690,268, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera configured to be disposed at a vehicle, the vehicular camera comprising:
   a lens barrel accommodating a lens;
   a front camera housing having a passageway therethrough;
   an imager printed circuit board (imager PCB), wherein the imager PCB comprises a first side and a second side opposite the first side and separated from the first side by a thickness of the imager PCB, and wherein an imager is disposed at the first side of the imager PCB, and wherein the imager PCB is attached at the front camera housing with the imager aligned with the passageway;
   wherein the imager comprises an imaging array having at least one million photosensor elements or pixels arranged in rows and columns;

wherein an attaching portion of the lens barrel is positioned at least partially in the passageway of the front camera housing with a gap between a longitudinally extending side wall of the attaching portion and a longitudinally extending side wall of the front camera housing that at least partially circumscribes the attaching portion of the lens barrel;

wherein the longitudinally extending side wall of the attaching portion of the lens barrel extends parallel to a longitudinal axis of the lens barrel, and wherein the longitudinally extending side wall of the front camera housing extends parallel to a longitudinal axis of the passageway;

wherein, with the attaching portion positioned at least partially in the passageway, a filler material is disposed at least partially within the gap and at least partially at the longitudinally extending side wall of the attaching portion and at least partially at the longitudinally extending side wall of the front camera housing;

wherein, with the filler material disposed at least partially within the gap, the attaching portion is movable within the passageway while the lens barrel is adjusted relative to the imager to align the lens relative to the imager; and wherein, with the lens aligned relative to the imager, the filler material is heated to melt and flow into the gap and at least partially along the longitudinally extending side wall of the attaching portion and at least partially along the longitudinally extending side wall of the front camera housing, whereby the melted filler material hardens upon cooling to secure the lens barrel relative to the front camera housing and the imager PCB.

2. The vehicular camera of claim 1, wherein the filler material is laser heated to melt and flow into the gap and at least partially along the longitudinally extending side wall of the attaching portion and at least partially along the longitudinally extending side wall of the front camera housing.

3. The vehicular camera of claim 1, wherein, with the imager PCB attached to the front camera housing, a rear camera housing is mated with the front camera housing.

4. The vehicular camera of claim 1, wherein the attaching portion of the lens barrel comprises a plastic injection molded element.

5. The vehicular camera of claim 1, wherein the attaching portion of the lens barrel comprises a metal element.

6. The vehicular camera of claim 1, wherein the front camera housing comprises a plastic injection molded element.

7. The vehicular camera of claim 1, wherein the front camera housing comprises a metal element.

8. The vehicular camera of claim 1, comprising an electrical connector portion configured to electrically connect to a wire harness of a vehicle equipped with the vehicular camera.

9. The vehicular camera of claim 1, wherein the filler material comprises a thermoplastic material.

10. The vehicular camera of claim 1, wherein the filler material has a melting point that is lower than respective melting points of the front camera housing and of the lens barrel.

11. The vehicular camera of claim 1, wherein, with the hardened filler material securing the lens barrel relative to the front camera housing, a sealant material is disposed over the hardened filler material to seal the gap between the attaching portion and the front camera housing.

12. A method for assembling a vehicular camera, the method comprising:
providing a lens barrel accommodating a lens;
providing a front camera housing having a passageway therethrough;
providing an imager printed circuit board (imager PCB), wherein the imager PCB comprises a first side and a second side opposite the first side and separated from the first side by a thickness of the imager PCB, and wherein an imager is disposed at the first side of the imager PCB;
attaching the imager PCB at the front camera housing with the imager aligned with the passageway;
positioning an attaching portion of the lens barrel at least partially within the passageway with a gap between a longitudinally extending side wall of the attaching portion and a longitudinally extending side wall of the front camera housing that at least partially circumscribes the attaching portion of the lens barrel;
wherein the longitudinally extending side wall of the attaching portion of the lens barrel extends parallel to a longitudinal axis of the lens barrel, and wherein the longitudinally extending side wall of the front camera housing extends parallel to a longitudinal axis of the passageway;
disposing a filler material at least partially within the gap between the attaching portion and the front camera housing and at least partially at the longitudinally extending side wall of the attaching portion and at least partially at the longitudinally extending side wall of the front camera housing;
with the filler material disposed at least partially within the gap, moving the attaching portion within the passageway while adjusting the lens barrel relative to the imager to align the lens relative to the imager; and
with the lens aligned relative to the imager, heating the filler material to melt the filler material and to flow the filler material into the gap and at least partially along the longitudinally extending side wall of the attaching portion and at least partially along the longitudinally extending side wall of the front camera housing, whereby the melted filler material hardens upon cooling to secure the lens barrel relative to the front camera housing and the imager PCB.

13. The method of claim 12, wherein heating the filler material comprises using a laser.

14. The method of claim 12, further comprising mating a rear camera housing with the front camera housing after the imager PCB is attached to the front camera housing.

15. The method of claim 14, wherein mating the rear camera housing with the front camera housing occurs before positioning the attaching portion of the lens barrel at least partially within the passageway.

16. The method of claim 12, wherein the attaching portion of the lens barrel comprises a plastic injection molded element.

17. The method of claim 12, wherein the attaching portion of the lens barrel comprises a metal element.

18. The method of claim 12, wherein the front camera housing comprises a plastic injection molded element.

19. The method of claim 12, wherein the front camera housing comprises a metal element.

20. The method of claim 12, wherein the filler material comprises a thermoplastic material.

21. The method of claim 12, wherein the filler material has a melting point that is lower than respective melting points of the front camera housing and of the lens barrel.

22. The method of claim 12, further comprising, after the filler material has cooled, and with the hardened filler material securing the lens barrel relative to the front camera housing, disposing a sealant material over the hardened filler material to seal the gap between the attaching portion and the front camera housing.

23. A vehicular camera configured to be disposed at a vehicle, the vehicular camera comprising:

a lens barrel accommodating a lens;

a camera housing comprising a front camera housing and a rear camera housing mated with the front camera housing;

wherein the front camera housing has a passageway therethrough;

wherein the rear camera housing comprises an electrical connector portion configured to electrically connect to a wire harness of a vehicle equipped with the vehicular camera;

an imager printed circuit board (imager PCB), wherein the imager PCB comprises a first side and a second side opposite the first side and separated from the first side by a thickness of the imager PCB, and wherein an imager is disposed at the first side of the imager PCB, and wherein the imager PCB is attached at the camera housing with the imager aligned with the passageway through the front camera housing;

wherein the imager comprises an imaging array having at least one million photosensor elements or pixels arranged in rows and columns;

wherein an attaching portion of the lens barrel is positioned at least partially in the passageway of the front camera housing with a gap between a longitudinally extending side wall of the attaching portion and a longitudinally extending side wall of the front camera housing that at least partially circumscribes the attaching portion of the lens barrel;

wherein the longitudinally extending side wall of the attaching portion of the lens barrel extends parallel to a longitudinal axis of the lens barrel, and wherein the longitudinally extending side wall of the front camera housing extends parallel to a longitudinal axis of the passageway;

wherein, with the attaching portion positioned at least partially in the passageway, a filler material is disposed at least partially within the gap and at least partially at the longitudinally extending side wall of the attaching portion and at least partially at the longitudinally extending side wall of the front camera housing;

wherein, with the filler material disposed at least partially within the gap, the attaching portion is movable within the passageway while the lens barrel is adjusted relative to the imager to align the lens relative to the imager;

wherein, with the lens aligned relative to the imager, the filler material is laser heated to melt and flow into the gap and at least partially along the longitudinally extending side wall of the attaching portion and at least partially along the longitudinally extending side wall of the front camera housing, whereby the melted filler material hardens upon cooling to secure the lens barrel relative to the front camera housing and the imager PCB; and wherein the filler material has a melting point that is lower than respective melting points of the front camera housing and of the lens barrel.

24. The vehicular camera of claim 23, wherein the attaching portion of the lens barrel comprises one selected from the group consisting of (i) a plastic injection molded element, and (ii) a metal element.

25. The vehicular camera of claim 23, wherein the front camera housing comprises one selected from the group consisting of (i) a plastic injection molded element, and (ii) a metal element.

26. The vehicular camera of claim 23, wherein the filler material comprises a thermoplastic material.

27. The vehicular camera of claim 23, wherein, with the hardened filler material securing the lens barrel relative to the front camera housing, a sealant material is disposed over the hardened filler material to seal the gap between the attaching portion and the front camera housing.

\* \* \* \* \*